Feb. 1, 1955   M. A. KENDALL ET AL   2,701,049
SPEED ADJUSTING CONVEYER FOR CONNECTING TWO
CONVEYERS RUNNING AT DIFFERENT SPEEDS
Filed June 7, 1951                          2 Sheets-Sheet 1
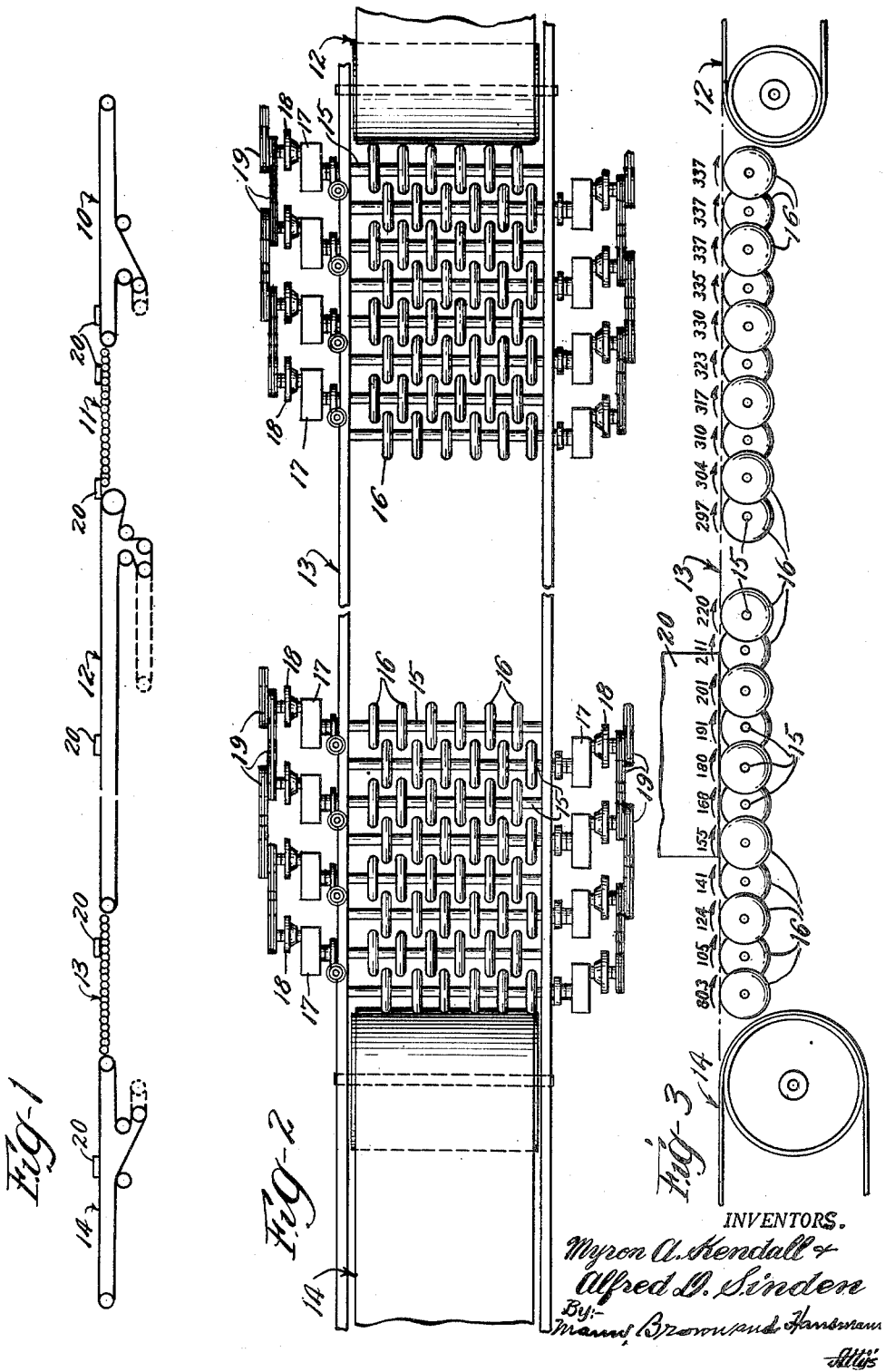
INVENTORS.
Myron A. Kendall &
Alfred D. Sinden Feb. 1, 1955    M. A. KENDALL ET AL    2,701,049
SPEED ADJUSTING CONVEYER FOR CONNECTING TWO
CONVEYERS RUNNING AT DIFFERENT SPEEDS
Filed June 7, 1951    2 Sheets-Sheet 2
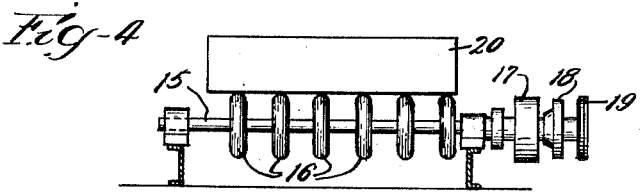
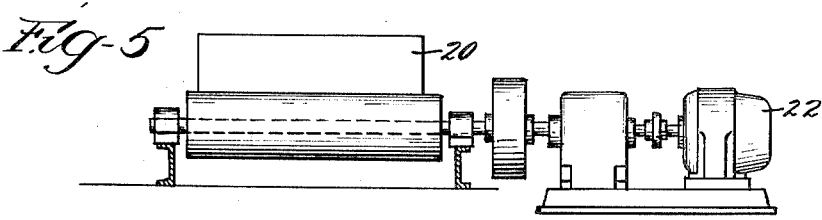
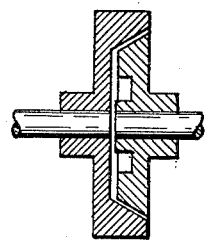 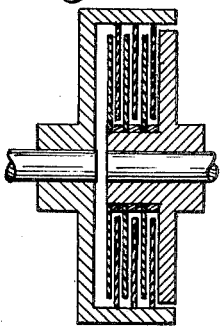 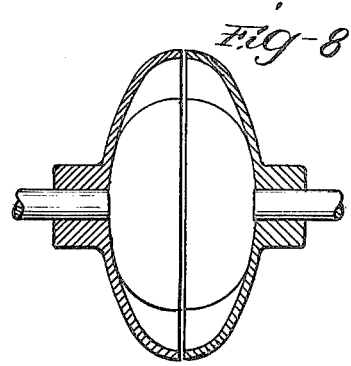
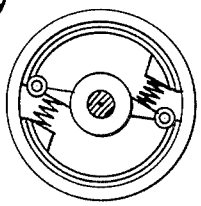
INVENTORS.
Myron A. Kendall &
Alfred D. Sinden

2,701,049

SPEED ADJUSTING CONVEYER FOR CONNECTING TWO CONVEYERS RUNNING AT DIFFERENT SPEEDS

Myron A. Kendall and Alfred D. Sinden, Aurora, Ill., assignors to Stephens-Adamson Mfg. Co., a corporation of Illinois Application June 7, 1951, Serial No. 230,398

6 Claims. (Cl. 198—127)

In our application Ser. No. 191,274, filed October 20, 1950, we disclosed an apparatus or machine for taking passengers in one direction from one point to another including a main high-speed conveyor, two low-speed auxiliary conveyors, one adjacent to but spaced from each end of the main conveyor, a loading platform alongside, close to and moving at the same speed in the same direction as one auxiliary conveyor, an accelerating conveyor receiving from the auxiliary conveyor and delivering to the main conveyor, a decelerating conveyor receiving from the high speed conveyor and delivering to the other auxiliary conveyor, and an unloading platform alongside, adjacent to, and moving at the same speed and in the same direction as the second auxiliary conveyor.

A series of independent cabs in circuit along the conveyors bunched at the loading and unloading platforms and strung out on the main high-speed platforms were specially designed for passengers.

The present invention relates to accelerating and decelerating conveyors suitable for use in that association and others, and has for its principal aim to transfer objects between two conveyors operating at different speeds with a smooth change of speed in going from one to the other.

In the drawings:

Fig. 1 is a diagram of conveyors arranged in series according to the invention;

Fig. 2 is a plan view;

Fig. 3 is a side elevation of one of the speed adjusting conveyors for transferring objects from one conveyor to another in a series;

Fig. 4 is a diagram of one form of drive for the live rollers of the speed adjusting conveyors;

Fig. 5 is a similar diagram of another form of the same;

Fig. 6 is a diagram of a cone clutch suitable for use as a constant torque coupling;

Fig. 7 is a diagram of a disk clutch suitable for the same;

Fig. 8 is a diagram of a fluid coupling; and

Fig. 9 is a diagram of a shoe-type coupling suitable for the same.

In Fig. 1, 10 indicates an auxiliary loading conveyor; 11 an accelerating conveyor connecting it with a main high-speed conveyor 12; and 13 indicates a decelerating conveyor connecting the high-speed conveyor with an auxiliary unloading conveyor 14.

The accelerating conveyor 11 is illustrated as a live roll table made up of shafts 15, each having 6 rubber tired rolls 16. Each shaft is driven independently through a constant torque coupling 17 and a speed reducer 18 from some source of power, such as a chain drive 19.

The constant torque couplings may be of any suitable kind, a selection of which is shown in Figs. 6, 7, 8, and 9, and are so familiar that any detailed description is believed unnecessary. However, it is to be noted that, whatever specific form of coupling be used, it is essential that a given maximum amount of torque be constantly available on each shaft for transmitting propelling energy to the object moving over the conveyor. In other words, the objective is to prevent any slippage between the rolls 16 and the object 20, irrespective, within limits, of the weight of the object 20; and, to accomplish this, each of the shafts being driven at a progressively different speed is provided with a "constant torque device," which in this application is intended to mean a slip coupling which can and does transmit a given maximum amount of torque before slippage takes place. This maximum torque is constantly available, but is selected at a value which is less than the torque required to produce slippage between the object transported on the conveyor and the rolls 16.

While overrunning clutches may be used with the speed adjusting conveyor, its function would be entirely different from that of the slip coupling 17. For example, considering the accelerating conveyor 11, there is no reason why an overrunning clutch cannot be used in series with the slip coupling 17, so that, when the object is moving at the speed of one of the latter shafts in the series, the rolls on the preceding shafts will not retard movement of the object at such speed.

Several rolls at each end of the series may have the same rim speed as the adjacent conveyor.

In this way, the objects 20 are received from the auxiliary loading conveyor at a suitable speed, such as 1½ miles an hour, and stepped up to a suitable speed such as 15 miles an hour, and delivered to the main high-speed conveyor 12. Speeds are optional and are selected according to the needs of the particular situation.

The function of the constant torque coupling is to rotate the roll at its predetermined resistance. If the resistance at the rim of the roll exceeds the predetermined amount, the rate of rotation will be reduced by slipping in the coupling, but the torque on the roll will remain constant. Thus, if an object is resting on three rolls, which would normally be running at different speeds, the friction due to weight of an object causes a greater tangential resistance than enough to cause slip in the coupling. Therefore, all three rolls turn at the same rim speed, which is the speed of the object at any moment. However, at least two of the rolls are attempting to turn at higher speeds and are applying their predetermined accelerating forces to speed up the object.

Similar remarks apply to the end rolls and the adjacent portions of the conveyors.

It is impossible for an object to be accelerated or decelerated faster than the rate corresponding to successive rim speeds of the rolls. It would be possible for the rate to be slower if the object were so heavy that the accelerating force was greater than the force transmitted through the couplings. Hence, it is necessary to have correct relation between maximum weight of objects, accelerating or decelerating rates, and torque to produce slipping in the constant torque couplings.

We also provide a margin of safety to insure an object having a speed corresponding to each conveyor as it leaves or enters on that conveyor.

If each roller had an invariable rim speed, it is evident that with an object riding on several rolls at once there would have to be slipping between the rolls and objects. That would be undesirable because of the wear, noise, and rough action. Therefore, a means is provided to prevent the slipping between the object and the roll, and confine it to the constant torque coupling.

It will be evident that amount of torque transmitted is not critical. Normally, there is a wide range between the force necessary to produce the desired acceleration and the force to cause slipping between an object and the rolls it is resting on. The torque of the coupling can be such as to give a rim force anywhere in the range.

What has been said about accelerating in passing between the conveyors 10 and 12 will apply without detailed explanation to the decelerating in passing between the conveyors 12 and 14.

The drive shown in Fig. 5 corresponds in all important respects to the drive shown in Figs. 2, 3, and 4, except that the power is derived from a motor 22.

We claim:

1. In a speed adjusting conveyor for connecting two conveyors running at different speeds, rolls in series to successively and in groups simultaneously cooperate in moving an object along the series, means to drive the rolls at speeds progressively different in the series including a plurality of power devices, and constant torque means connecting the power devices with the rolls including a fluid coupling.

2. A speed adjusting conveyor for transporting an object from one end of the conveyor to the other at a progressively different speed, said conveyor comprising a plurality of parallel shafts having rolls mounted thereon for supporting the object as it moves over the conveyor, bearing supports for said shafts, drive means for driving at least some of the shafts at progressively different speeds, the shafts with their rolls being sufficiently close to one another that the object being moved over the conveyor is at times supported on more than one of said progressively driven shafts, and slip means interposed in said drive means for preventing slippage between the object and said rolls, said slip means including a slip coupling for each of said progressively driven shafts, said slip couplings each having a pre-set torque value such that the torque required to produce slippage in each slip coupling is less than the torque required to produce slippage between said rolls and the object supported on said conveyor, and said slip coupling being constructed and arranged so that its operation is independent of the vertical load on the shaft with which it is associated.

3. A speed adjusting conveyor for transporting an object from one end of the conveyor to the other at a progressively different speed, said conveyor comprising a plurality of parallel shafts having rolls mounted thereon, bearing supports for said shafts, said shafts being sufficiently close to each other that the object when moving across the conveyor is at times supported by the rolls of two or more shafts, and means for driving said shafts at progressively different speeds, each of said shafts having a slip coupling interposed between the drive for that shaft and the bearing support therefor, whereby the action of the slip coupling is substantially independent of the mass of the object moving over the conveyor.

4. In a speed adjusting conveyor for transporting an object from one end of the conveyor to the other at a progressively different speed, a plurality of parallel shafts having rolls thereon for supporting said object, bearing supports for the shafts, means for driving the shafts at progressively different speeds, and a slip coupling in the drive for each shaft, said slip couplings each having a pre-set torque value such that the torque required to produce slippage in each slip coupling is less than the torque required to produce slippage between said rolls and said object, said torque value being independent of the vertical load on said bearing supports.

5. A speed adjusting conveyor for transporting an object from one end of the conveyor to the other at a progressively different speed, said conveyor comprising a plurality of parallel shafts having rolls mounted thereon, bearing supports for said shafts, said shafts being sufficiently close to each other that the object when moving across the conveyor is at times supported by the rolls of two or more shafts, and means for driving said shafts at progressively different speeds, each of said shafts having a separate slip coupling interposed in the drive therefor, said slip couplings each having a pre-set torque value such that the torque required to produce slippage in each slip coupling is less than the torque required to produce slippage between said rolls and the object supported on said conveyor.

6. A speed adjusting conveyor as set forth in claim 4, in which said slip coupling is adjustable as to the torque required to produce slippage in the coupling.

References Cited in the file of this patent

UNITED STATES PATENTS

| 770,260 | Cahill | Sept. 20, 1904 |
| 872,457 | Russel | Dec. 3, 1907 |
| 1,831,015 | Mare | Nov. 10, 1931 |
| 2,602,536 | Eggleston | July 8, 1952 |

FOREIGN PATENTS

| 527,290 | Germany | June 16, 1931 |